United States Patent [19]

Foster

[11] Patent Number: 4,602,907

[45] Date of Patent: Jul. 29, 1986

[54] LIGHT PEN CONTROLLED INTERACTIVE VIDEO SYSTEM

[76] Inventor: Richard W. Foster, 721 Clinton Ave. West, Suite 9-B, Huntsville, Ala. 35801

[21] Appl. No.: 678,670

[22] Filed: Dec. 5, 1984

Related U.S. Application Data

[63] Continuation-in-part of Ser. No. 293,326, Aug. 17, 1981, abandoned, which is a continuation-in-part of Ser. No. 29,282, Apr. 11, 1979, abandoned.

[51] Int. Cl.⁴ .......................... G09B 7/02; G09B 7/06
[52] U.S. Cl. .......................... 434/337; 273/DIG. 28; 340/707
[58] Field of Search ................ 434/335, 337; 358/102; 340/707; 250/271, 203, 549; 273/DIG. 28

[56] References Cited

U.S. PATENT DOCUMENTS

| | | | |
|---|---|---|---|
| 3,130,305 | 4/1964 | Sutherland | 250/271 |
| 3,492,478 | 1/1970 | Smith | 250/271 |
| 3,573,785 | 4/1971 | Miller | 250/271 |
| 3,775,005 | 11/1973 | Szabo | 340/707 |

Primary Examiner—Richard C. Pinkham
Assistant Examiner—MaryAnn Stoll Lastova
Attorney, Agent, or Firm—C. A. Phillips

[57] ABSTRACT

A system for detecting the position of a light responsive pen with respect to a TV display wherein successive frames of a video recording are encoded by placing a lighted area in a different place on each such successive frame. Then, by determining the frame number of the frame appearing when there is a response from the light pen, the position of the pen is identified and an appropriate system response is initiated and controlled.

2 Claims, 6 Drawing Figures

LIGHT PEN CONTROLLED INTERACTIVE VIDEO SYSTEM

This application is a continuation-in-part of application Ser. No. 293,326, filed Aug. 17, 1981, entitled "Light Pen Controlled Interactive Video System," (now abandoned) which is a continuation-in-part of application Ser. No. 29,282, filed Apr. 11, 1979, entitled "Post Response Interactive Information System" (now abandoned).

TECHNICAL FIELD

This invention relates generally to computer assisted instruction systems, and particularly to a system of this character wherein a light responsive wand or light pen, as it is usually called, is used for indicating a particular response of a student or operator to information previously presented by, or action desired from, an interactive video bandwidth information system.

BACKGROUND ART

In conventional Computer Assisted Information or Instruction (CAI) Systems, use is often made of a light pen. This pen is a tube containing a photodiode. When the tube is placed against a conventional raster scan TV picture tube and the scanning beam passes through its field of view, the resistance of the photodiode, and in some implementations a phototransistor, is sensed by the logic of the machine. The time when this occurs is correlated to the scan line number and horizontal position and the position of the light pen on the screen is derived. From this information, the logic assembly or computer takes appropriate action as, for example, to indicate a correct or incorrect answer to a question, or to cause the retrieval and reproduction of remedial instructions, or of stored information, or other control input by the student or operator.

In order to accomplish this effect in a conventional video-display system, it is necessary to count the number of scan lines to the line where the pen responds. It is further necessary to determine the amount of time required for the writing beam to accomplish a horizontal scan to the pen position.

A second method commonly used requires the logic portion of a computer to generate a lighted "area" which may be positioned at various locations on the screen or may be used to scan the full face of the display device in a manner similar to raster scanning. This is a coarser version of the approach described above.

Both these approaches generate the scanning image electronically and create a need for complex electronic circuitry to determine the timing and then to convert this information to a message defining the pen position in a form that is compatible with digital systems. These approaches also require the user to be knowledgeable in computer programming in order to use such systems, and further requires the additional complexity of a computer in order to make use of the pen position information that is presented as a digital signal to the digital computer by the complex electronic circuitry. The costs associated with such devices run into the hundreds of dollars and create an additional requirement in that an extensive computer logic equipment and an interfacing routine is required to convert the digitized pen position data to appropriate response by the operating program in a CAI or information retrieval system.

OBJECTIVES OF THE INVENTION

In conventional light pen controlled systems, as previously described, the light pen produces a signal as a consequence of being illuminated by a light, dark, or colored area generated by electronics at the time of use of the light pen and not one generated by a part of the recorded video image recorded prior to time at which the light pen is being used. Further, conventional systems use computer programs to properly select system action as a response to light pen position. These computer programs, in turn, require extensive, costly computer systems to accomplish this control action. Further, these computers must be supported by extensive and costly computer memories capable of storing all possible responses that might occur.

The objectives of this invention are to eliminate the need for the generation of lighted areas for the use of light pen response devices where these lighted areas are generated by means of electronic devices in the playback system.

It is a further objective to eliminate the need for an extensive computer memory to store all possible responses to which the light pen signal must be compared in order to select the desired response of the system.

It is a further objective to simplify the method of preparation of recorded video material and that material's use to provide a system that is responsive to light pen control that is readily understandable, and thus useable, by persons not skilled in the art of digital device programming in order to enable such persons to make direct use of light pen response in interactive video systems.

It is a further objective to simplify and reduce to a single element a light responsive pen coupled to a standard digital input providing only true and false inputs (lighted and unlighted) and to place all other control information onto the video bandwidth storage medium, an inexpensive storage medium, thus making the system suitable for broad use in video bandwidth storage devices through the use of a simple and inexpensive control system design.

DISCLOSURE OF THE INVENTION

In accordance with this invention, a video monitor is connected to a conventional random access video playback device. This device is controlled by a control logic circuit to which one input is provided by a light pen having a discrete field of view. In the present as well as in other systems, the control logic circuit operates to determine the pen position. Rather than accomplishing this with a complicated electronic circuitry based upon timing measurements, the present system combines graphic materials stored as single images to provide information as to pen location. This is accomplished by dividing the picture format into a plurality, for example, six segments or option areas, and then providing from graphic material, stored in the random access video playback device, a like number of TV images or frames wherein only one of the six would have a light, dark, or otherwise colored, region in the segment. By holding the light pen over one segment of the video monitor displaying the material, there will be an output from the light pen to the control logic when a frame occurs that has a selected light (or dark) region in the segment selected. By also supplying to the logic circuit numbers of the frames as the frame appear, by coincidence and gating means, the selected frame is read out or otherwise used for control purposes.

The system illustrated as incorporating this invention employs a single track wide spectrum reproduction unit, and preferably a video disc-type unit capable of playback at least up through the conventional video range of 4 MHz, and preferably upward to 20 to 30 MHz. Such a latter capability has been demonstrated by the DiscoVision disc player developed by DiscoVision Associates of Costa Mesa, Calif.

A previous proposal of usage for the DiscoVision system is for the recording and playback of combined picture and audio signals in a signal range of from 0 to 9.5 MHz. The present invention preferably contemplates that there be recorded on a disc of this system, or another, a plurality of channels. The channels would include modulated subcarriers within a spectrum extending upward to near 30 MHz. Typically, one of the subcarriers would be a TV subcarrier made up in accordance with a proposed NTSC format. Alternately, instead of an NTSC format, and as a feature of this invention, the brightness portion of the signal of the illustrated format may be digitally modulated, or modulated with compressed audio or facsimile signals. In either case, the subcarrier carries the sync signals conventionally employed to time the sweep of the electron beam of a TV monitor for each line and frame scan, and these are used to mark and thus count discrete frame and line prints or track positions along the recorded track. Pertinent to pure TV usage, a color frequency signal burst is provided to unravel compressed color information. In all cases, the frequency content of a channel would be such as to not create harmonic or image responses which would interfere with data in other channels.

In the present system, a particular data sequence to be reproduced as sound, displayed, or otherwise presented, would be based upon interaction between circuitry controlling the operation of the disc player and a signal generated by a person, as per a teaching device or information retrieval system, or by a signal derived from some detected physical condition as, for example, the condition of a machine, as in the case of an industrial system.

In the first case, where a signal is generated by a person, there would be a light pen with electrically encoded outputs which would provide an input to a comparator, which input would be compared therein with a question from a discrete sequence of reproduced data; and, depending upon the selection indicated by the light pen, the random access video disc player or random access tape unit would be directed to reproduce from some other pre-programmed portion of the disc or tape. In the case of checkout or process control systems, for example, the digital output from a disc or tape would be received, and this output compared with an electrical representation of the state of a particular point in the system; and, depending upon correlation, or lack of same, the player would be operated to proceed with selected additional tests, or to direct, via one of the subcarrier outputs, system adjustment.

In order to employ the DiscoVision unit as described herein, it is important that there be recorded on a subcarrier information indicating the start of each frame and each line of each frame, this being normally accomplished from the presence of a vertical pulse (for frame) and horizontal pulse (for line) identification of pulses in the TV brightness signals. Further, there is required a speed reference signal, typically a 3.58 MHz signal appearing on the subcarrier. If the illustrated proposed NTSC format is dispensed with, position and speed information would be encoded in another form and frequency then indicated. When this is done, modulated subcarriers may be positioned in any desired arrangement.

Referring to FIG. 2a, spin motor drive 18 of the DiscoVision player rotates turntable 20 at 1798.2 rpm, on which is positioned one of the discs, disc 10. Optical reproducer 22 is radially driven by slide motor 24 to move the reproducer radially to effect approximate tracking of spiral track 36 during reproduction (precise tracking control is described below). Slide motor 24 also is operable rapidly to position reproducer 22 to a selected starting point on the track. The speed of disc 10 is sensed by a tachometer (not shown) coupled to turntable 20, and its output (electrical) is compared with the output of a 3.58 MHz crystal oscillator (not shown), whereby the speed of spin motor 26 is controlled with a close range. The final speed is controlled by a comparison of the oscillator frequency with the 3.58 MHz subcarrier recorded on the disc. This frequency was chosen by the manufacturer of disc equipment to coincide with the 3.58 MHz colorburst signal transmitted during the back porch interval of each horizontal sync pulse.

Reproducer 22 includes a low powered laser 30 which provides a beam which is directed to beam splitter 32. A portion of the beam continues through beam splitter 32 and through mirror 34 where it is reflected onto a data track 36 of disc 10 in the form of a very fine read spot 38. A small portion of the laser beam is deflected by beam splitter 32 to photocell 40 which monitors the output of laser 30. The reflected read beam from disc 10 strikes mirror 34 and is reflected onto beam splitter 32 where it is deflected to pin photodiode 42. Electrical outputs of photocell 40 and pin diode 43 are fed to tracking electronics 44 wherein the output of photocell 40 provides displacement information of the read spot light beam in both radial (radially from the center of the track) and tangential (along the track) directions, and provides radial and tangential direction information to controls 46 and 48 of mirror positioner 50 to compensate for any tracking error. Specifically, the correction of the tangential direction by tracking electronics 44 compensates for any time-base error occurring over the time interval of one revolution, and radial corrections by tracking electronics 44 provide fine radial adjustments to compensate for any eccentricity of the disc, thus keeping the read spot in the center of the data track. The output of photocell 40, indicative of the output of laser 30, enables the tracking electronics to ignore variations present in the read signal which are simply a function of variation in the output of laser 30.

BRIEF DESCRIPTION OF THE DRAWINGS

FIG. 1b is a schematic illustration of a recording arrangement for preparing a video disc in accordance with the system requirements illustrated in FIG. 1a.

DETAILED DESCRIPTION OF THE DRAWINGS

Figure 1A:
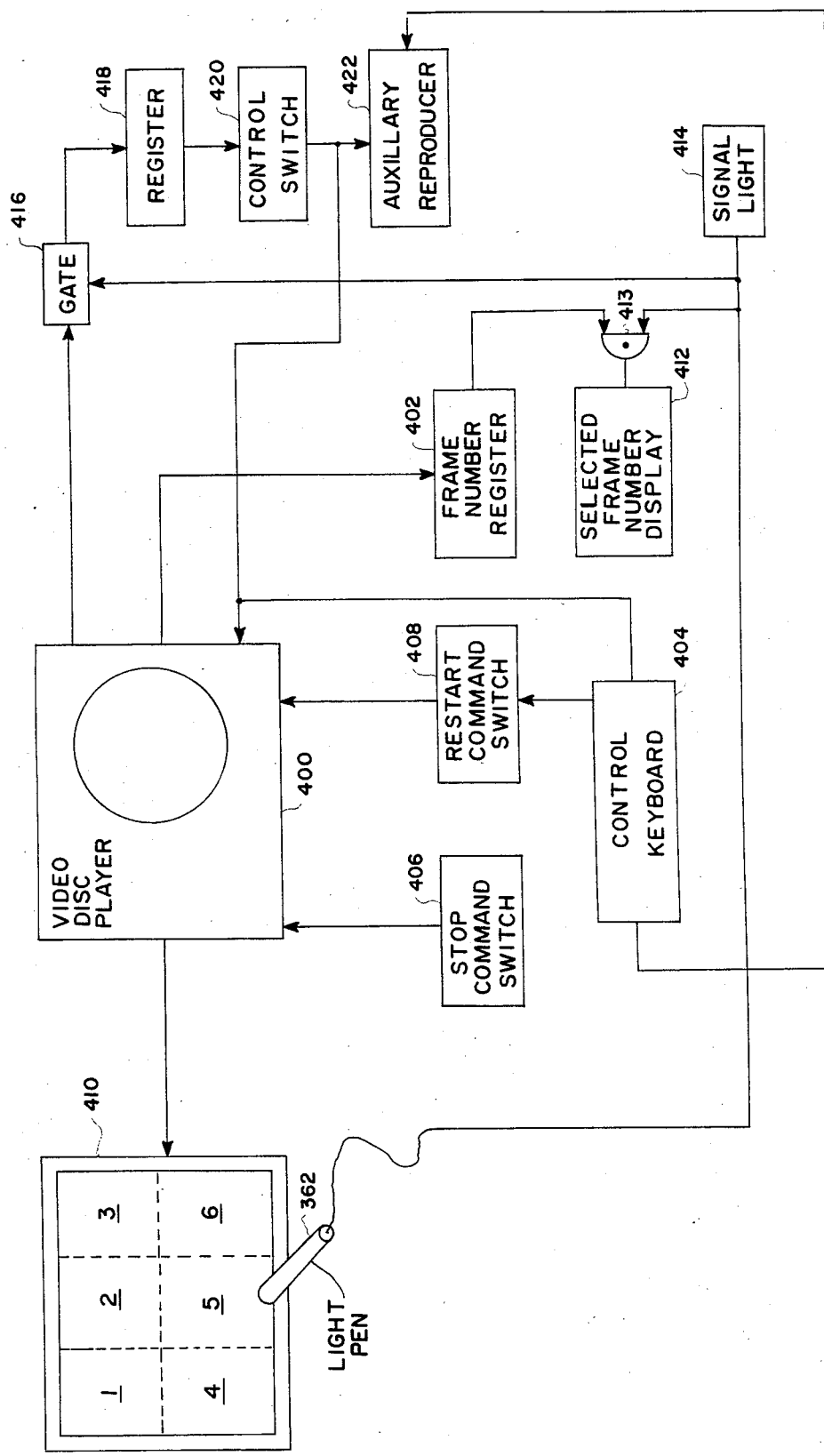
FIG. 1a is a schematic illustration of an embodiment of the invention.

Referring to FIG. 1a, illustrating the system of the invention, video disc player 400 is commercially manufactured, for example, the PR-7820 by DiscoVision Associates, Inc. or the VP-1000 by Pioneer Company, and includes means for developing a signal representative of the present frame being played. Such signal is taken as an output and fed to a present frame number register 402. The player also conventionally provides means for commencing operation at a selected frame from a frame number, and this number is provided from a control keyboard generator 404 to player 400. Alternately, this is provided through a selector typically incorporated directly in the player. The player also includes stop and start playback controls illustrated by a clock marked "Stop Command Switch 406" and "Restart Command Switch 408". As shown, restart command switch 408 may be operated by keyboard 404 which would provide an energizing start signal upon the pressing of a selected button on the keyboard. The video output of player 400 is fed to a conventional TV display 410, the face of the display being divided into, for example, six segments, segments 1, 2, 3, 4, 5, and 6. Actually, it is not necessary to provide a discrete division on the monitor as there may be recorded on a video disc 10 (FIG. 2a) of player 400 material which effects this segmented display arranged in a variety of segments in form and number when it is desired that the viewer select a segment of the display.

The selection is effected by a light pen 362, a photoresponsive device which provides an output signal when it is positioned to sense light from a particular segment of the screen, and that segment is particularly lighted during a frame or frames of the display. This output is fed as a gating control signal to gate 413 through which the frame number in register 402 is fed. Thus, by playing in sequence pictorial frames having first and then another of the segments of display lighted, with the other segments being simultaneously black, a particular frame may be identified. Thus, when positioned light pen 362 responds to a discrete light condition, gate 413 will gate through to display 412 the frame number of the frame producing it. As an illustration of usage of the system, certain information would be recorded on and then reproduced from video disc 10 (FIG. 2a) and on display 410 (FIG. 1a). Thereafter, a multiple choice of up to six (or more where there are more segments of the display programmed) segment coded selections are presented for a viewer to choose from. The coded selections may be, for example, in the form of discretely positioned answers to a question or may be merely a selection of an object appearing in a discrete programmed segment of the display. In any event, the viewer would make a selection of a position for the light pen to sense light from one of the programmed segments. The selection of a position might be best made by first stopping reproduction, and this would be done by operating stop command switch 406 to effect a stoppage of video disc player 400. In which case, with the light pen selectively positioned, reproduction would be restarted by restart switch 408. Recorded on the disc being played back would be a coincident frame for each possible selection. Thus, a first frame may have a light area segment 1, a second frame would have a light area segment 2, and so on, through a sixth frame. In cases where the function is the selection of six possible multiple choice answers to questions, as where the system is used in an instructional system, the answers would be visually reproduced as identifying numbers corresponding to the six segments. Thus, if the selected number was 5, the pen would be placed as shown. If this was the correct number, the fifth of a series of six frames would have a light area in segment 5. Coincident with the appearance of this frame, the light pen would send a gating pulse to gate 413, and the frame number from register 402 would be gated into display 412. In cases where a correct selection needs to be known, the display may provide either for the display of the frame number, or there might simply be signalled the occurrence of a correct answer. In the latter case, the output of light pen 362 may be fed to a signal light 414. Further, in instances where it is desired to direct the video disc to play back certain material on the disc, which is a function of a selection made via the light pen, following positioning of the light pen by the student or operator, playback of the sequence of frames would be initiated, and there would be played back pre-recorded frame numbers (or other numbers or symbols identifying a new frame number) of the starting position on the video disc of the desired follow-on material. Coincident with each light area segment, such frame numbers would be either recorded on the disc in a video channel or an audio channel, or as a discrete signal in the broad bandpass spectrum of the video disc, without reference to a particular television format. In any event, the number would be fed through gate 416 which is controlled by an output from light pen 362. Thus, dependent upon a selection made by the position of light pen 362, gate 416 wold gate into register 418 the frame number of the commencement of material which is desired to be played back as a result of the selection made by light pen 362. Then, either automatically or by operation of control switch 420, the command number in register 418 would be fed as a go-to-and-playback command to video disc player 400. This is readily provided by an input to video disc player 400, such players typically having built-in means for causing playback from materials starting at a selected frame number. If the player is not so equipped, an external random access control between control switch 420 and disc player 400 and frame number register 402 would be enabled. By determining branching of playback as a function of a light pen selection, and with pre-recorded branching instructions on the disc, it is not necessary to employ an auxiliary computer or other form of auxiliary information storage and computer control, greatly simplifying and reducing the cost of an interactive information system.

In accordance with instructions either received from a prerecorded television presentation or from auxiliary reproducer 422, in the event that a particular comparison required a system process change or further observation or measurement, this would be directed by the automatic playback or pre-selected material on the disc or by a gated out signal (in place of a recorded frame number) resulting from his selection.

As still a further example of use of this invention, assume that there is recorded on disc 10 and displayed on display 410 a diagram (or picture) of a complex system (or machine), and a viewer desired additional information, either by text material or by illustration, of a detail of the system. The above process simply requires appropriate subdivision of a TV frame into sequentially detectable light differential segments. As a further feature of the invention, where it is desired that reproduction be from an auxiliary reproducer 422, such as a slide projector, an encoded symbol or number other than a frame number would be pre-recorded on a video disc, which would then be recognizable by the auxiliary reproducer, which may be another video disc unit or a random access information storage device, to effect the desired playback of additional images or other information. Additionally auxiliary reproducer 422 may be controlled by keyboard 404 to independently effect playback of material either independent of or related to the playback of video disc player 400. For example, auxiliary producer 422 may be directed to present certain informational material, and thereafter related material selections would be made via material recorded on a video disc and selected by light pen 362, as described above.

Figure 1B:
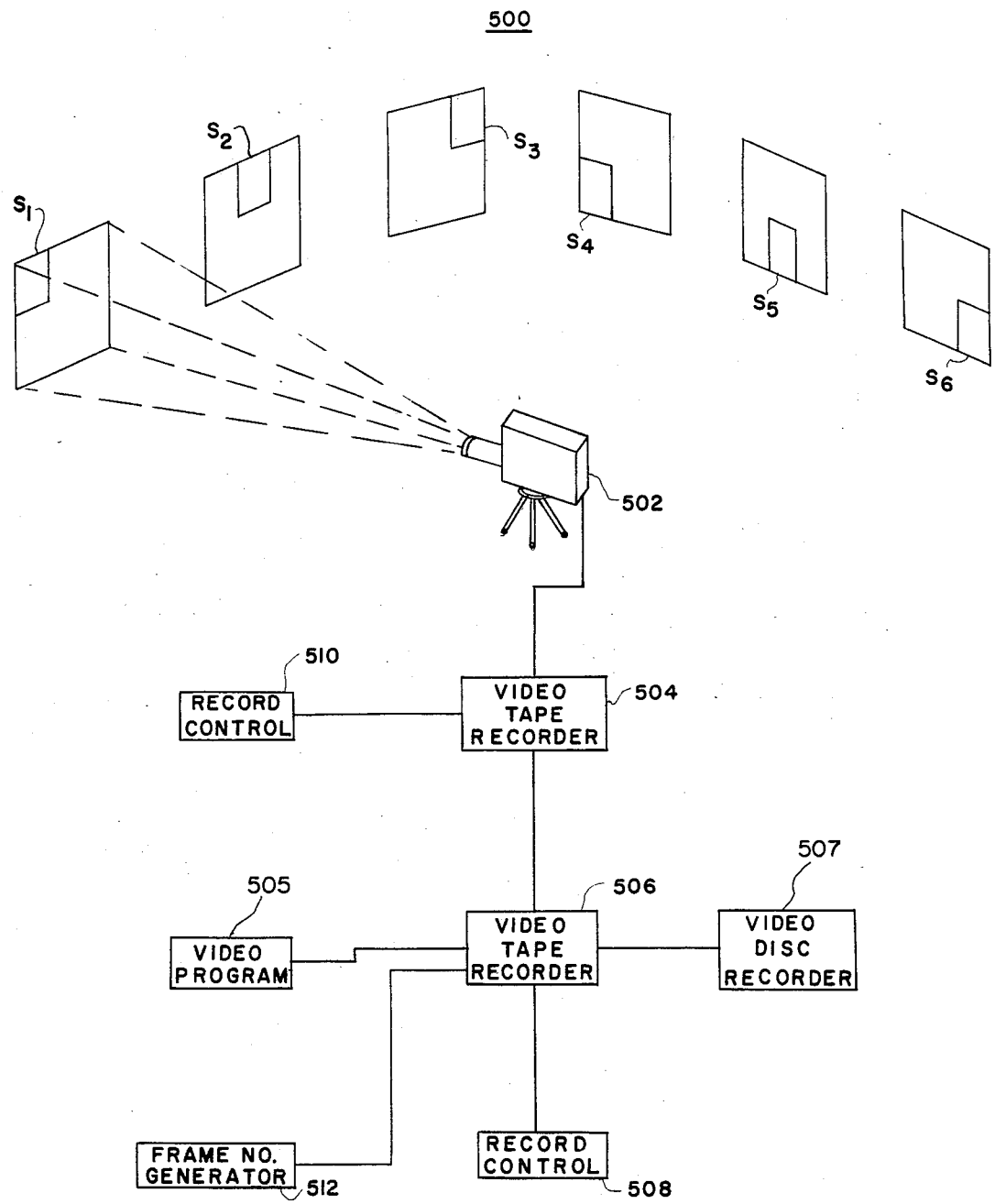

FIG. 1b illustrates a system for preparing an encoded recording in accordance with the playback system of FIG. 1a. A plurality of cards 500 (six are shown) have discrete segment codings wherein the enclosed segment areas S1-S6 bear a distinct pictorial contrast from the surrounding portions of the cards. For example, segment areas S1-S6 are illustrated as black, and the surrounding areas white. Where a color television is employed, there may be a color contrast, and the light pen used may be responsive to one or more specific colors. In addition to two-dimensional or flat cards, three-dimensional objects may be painted in various colors for use with such pens. However, for purposes of description, two-dimensional black and white cards will be used.

The cards are individually photographed by TV camera 502, and a picture of each card is recorded at a discrete location on tape by video recorder 504. Video program material 505 (e.g., a lecture divided into a series of succeeding sections) would be fed to video tape recorder 506, the first section being fed to and recorded by video tape recorder 506 and then the recording process halted. This first section of the recording would conclude with a multiple choice type question having, for example, six possible answers, which answers would be displayed and identified by the numbers 1-6. Then, by means of record control 510 (a conventional control to enable a single frame recording), video tape recorder 504 would feed to video tape recorder 506 each of the recorded pictures of cards 500, with each being recorded on a separate frame of succeeding frames on a disc system and a series of frames of sufficient number to compensate for start/stop time lags in a tape based system. In addition, frame number generator 512 would coincidently feed to tape recorder 506 a command number, there being a discrete number for each frame, and thus for each encoded segment. This number would be representative of the frame location of the commencement of recorded material which is desired to be reproduced based upon a selection of one of the answers of the multiple choice question. The material may constitute another selection of lecture, a repeat of the same section, or reference material on the recording apart from the lecture, including digital program instructions stored in the audio or video bandwidth portions of the recorded signal at the new location. Thus, for example, if a correct answer is given, the recorded number may be the frame identification number of the commencement of the next following section of lecture. Otherwise, the recorded number might direct reproduction of another portion of the recording which may contain particularly remedial material relating to a particular incorrect answer. Upon completion of the recording of all sections of a lecture, and any additional reference material to be recorded, and the encoded art work and frame numbers, a finished recording would be played back from recorder 506 or from a separate playback unit and fed to video disc recorder 507 for the final recording in conventional form on a disc for playing back on video disc player 400 (FIG. 1a).

Figure 2A:
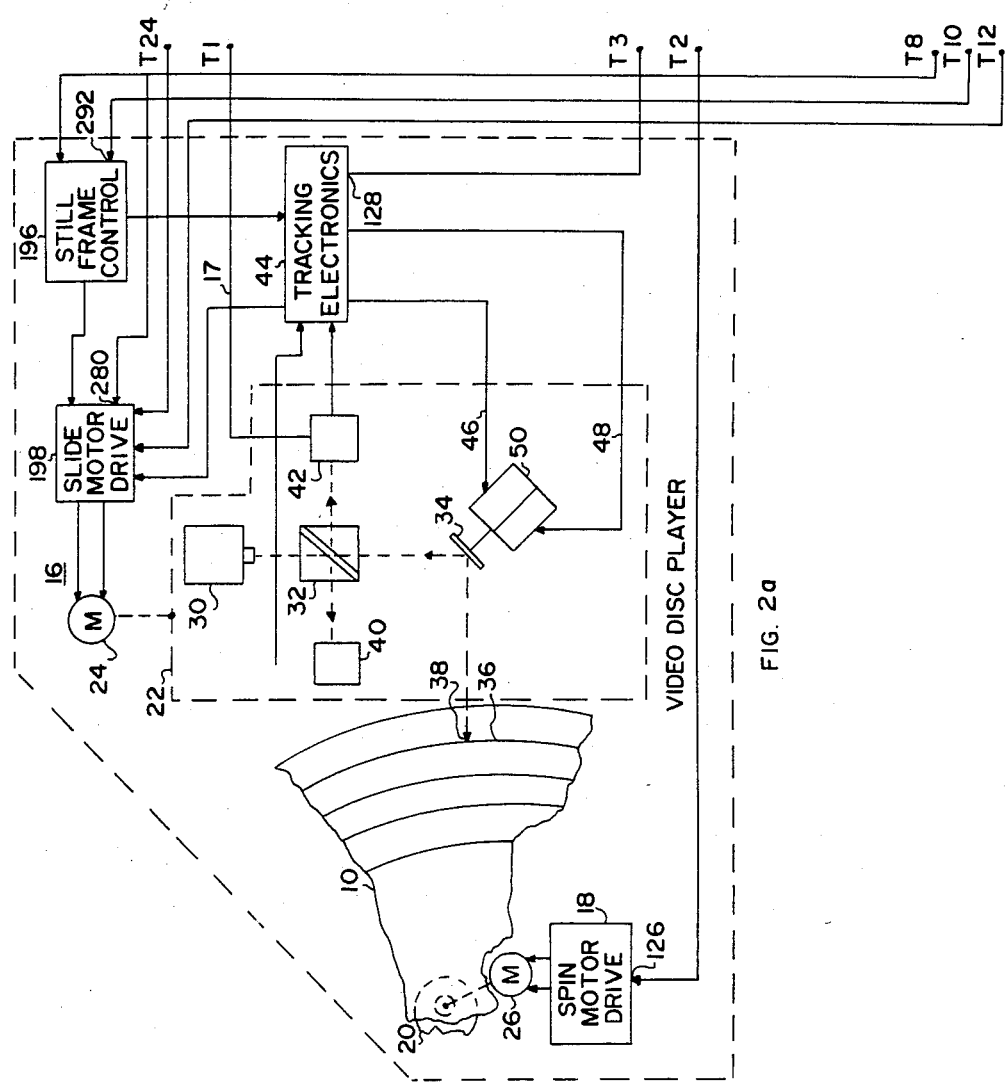
FIGS. 2a–2c combine as a block diagram to illustrate in greater detail a system on which the invention is incorporated.
Figure 2B:
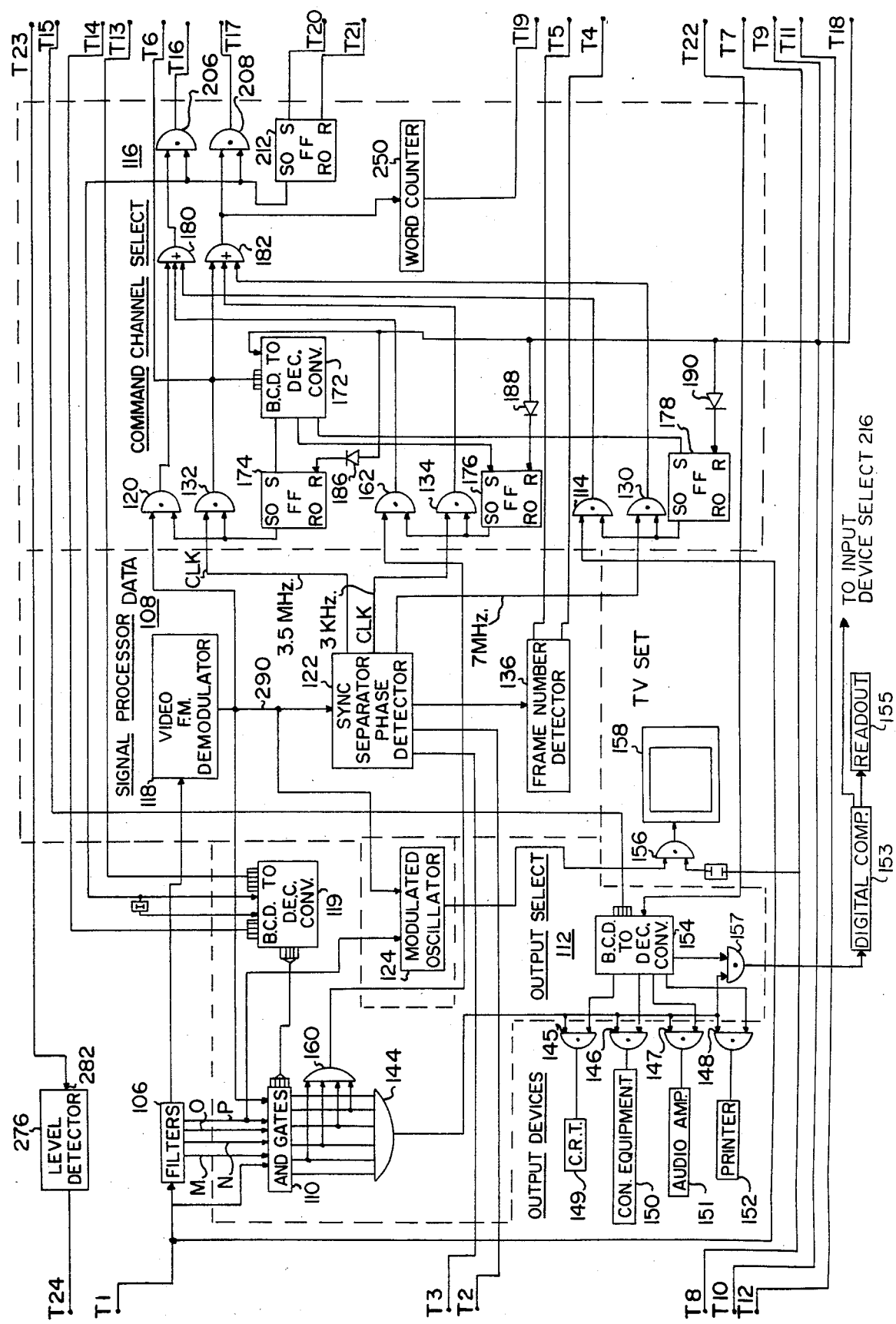
Figure 2C:
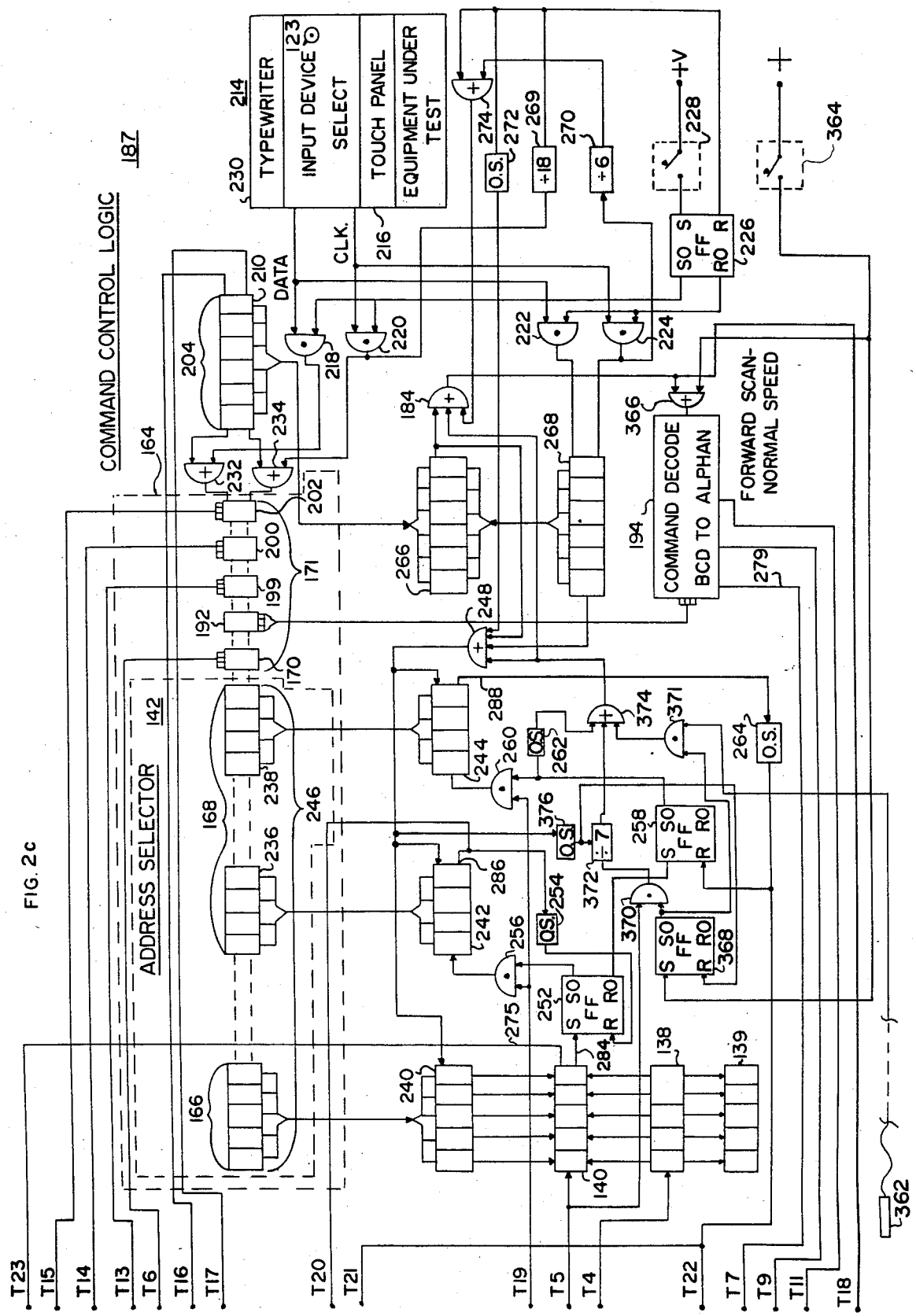

Referring now to FIGS. 2a-2c, illustrating in detail an informational system employing the invention, pin diode 42 of disc player 16 provides an output 17 which is supplied through common terminal T1 to bandpass filters 106 of signal processor 108. This signal is further fed as one input of AND gate 110 of "output select" 112 and as one input of AND gate 114 of "command channel select" 116. Bandpass filters 106 separate and demodulate the low frequency audio channels M, N, O, and P from the higher frequency signals of output 17. These remaining signals, which are NTSC video and color subcarrier, are fed directly to the input of video FM demodulator 118 (FIG. 2b).

The video signal is demodulated and coupled to one input of AND gate 120 of command channel select 116, one input of AND gate 110 of output select 112, as an input to sync separator 122, and as an input to modulated oscillator 124 of signal processor 108. By means of sync separator 122, the video signal is processed so as to separate the TV sync signals from video information and colorburst (3.58 MHz subcarrier) from horizontal sync pulses.

The colorburst signal is phase detected and coupled through common terminal T2 to input 126 of spin motor drive 18 where it is used as a reference to maintain a precise speed of spin motor 26 (FIG. 2a), and thus provides an accurate time base for TV reproduction as previously described.

A second phase detected output of the colorburst from sync separator 122 is coupled through common terminal T3 as an input 128 of tracking electronics 44 of video disc player 16 (FIG. 2a).

Further, three clock rates are derived from the 3.58 MHz color subcarrier of sync separator 122. These are a 7.16 MHz clock, a 3.58 MHz clock, and a 3 KHz clock, which are coupled as one input of AND gates 130, 132, and 134, respectively, of command channel select 116.

And finally, a frame number which is produced during each vertical sync pulse interval is connected as an input to frame number detector 136. Thus, a frame number, in serial format, is fed through common terminal T4 to frame storage register 138, and a vertical gating pulse is fed through terminal T5 to comparator 140 of address selector 142.

Information from any audio channel M, N, O, and P, in addition to the 30 MHz output 17 of photodiode 42 and video at the output of video FM demodulator 118, is selectively gated by BCD to decimal converter 119. Any selected output of AND gate 110 is coupled by OR gate 144 as one input of AND gates 145-148. Accordingly, information from any selected channel can be directed to any of output devices 149-152 by an output of BCD to decimal converter 154. Audio output P and video from FM demodulator 118 are fed as inputs to modulated oscillator 124, an output of which is coupled through AND gate 156 to TV set 158.

Encoded data from any audio channel M, N, O, and P is also gated through AND gate 110 and OR gate 160 as an input to AND gate 162 of command select 116. Selections of pre-encoded data from disc 10 is accomplished by a command word which is stored in command register 164 (FIG. 2c), in a manner to be described. Each command word includes an address consisting of a 5 BCD digit frame number, stored in the 5 most significant digit (M.S.D.) stages 166 of register 164.

The first and last word of any selected frame is then designated by the next eight significant stages 168 of register 164. Next, M.S.D. stage 170 is coupled through terminal T6 as an input of BCD to decimal converter 172, which selectively pulses the set input S of flip-flops 174, 176, and 178. The set output SO of one of selected flip-flops 174, 176, and 178 enables clock and data signals through AND gates 132 and 120, 134 and 162, or 130 and 114, respectively. As a result, a command word from the output of demodulator 118, one of audio channels M-P or 30 MHz channel 17, is fed to OR gates 180 and 182. A command digit is strobed into converter 172 by a signal from OR gate 184 of command control logic 187, in a manner to be described. Flip-flops 174, 176, and 178 are reset through diodes 186, 188, and 190 by a leading edge of the strobe pulse at the output of OR gate 184, which is interconnected through terminal T18.

The next most significant stage 192 of register 164 contains an alphanumeric character which supplies instructions to command decode 194. These commands include "go-to", "forward-normal speed" and "stop" commands which position reproducer 22 of disc player 16 (FIG. 2a), in a manner to be further described. A "go-to" command signal is routed from command decode 194 through series connected terminals T7 and T8 as one input of still frame control 196 and one input of slide motor drive 198. A "stop" command is fed through serial terminals T9 and T10 as an input to still frame control 196. The "forwardnormal speed" command is connected through serial terminals T11 and T12 as an input to slide motor drive 198.

Stage 199 of register 164 is coupled to BCD to decimal converter 119 through terminal T13 and selects a desired command channel.

Stage 200 selects a desired output channel and is connected through terminals T14 as one input of BCD to decimal converter 119.

Stage 202 determines a selected output device and is routed through terminals T15 as a second input to BCD to decimal converter 154.

For example, the last six positions (more may be required) 204 of register 164 are reserved for the correct answers to a question asked of a student, or in some instances, data stored for later comparison. Commands can be loaded into register 164 from two different sources. First, and as described above, command words are selectively gated through OR gates 180 and 182 from any channel and directed as data and clock inputs to AND gates 206 and 208, respectively. Henceforth, they are routed through terminals T16 and T17 into stage 210 of register 164 by the set output SO of flip-flop 212 at the beginning of the selected command. Secondly, a command word is entered in register 164 from one of input devices 214, which determines where video player 16 begins to reproduce or retrieve information from disc 10. Data and clock signals from one of input devices 214 are selectively coupled by selector 216 to AND gates 218 and 220, respectively, and to AND gates 222 and 224, respectively. AND gates 218 and 220 are then enabled by the set output SO of flip-flop 226, the reset output RO of which is coupled to the enable inputs of AND gates 222 and 224. In order to load register 164 with the appropriate initial instructions to player 16, momentary switch 228 of command/control 187 is closed to change flip-flop 226 to a set state.

Information then entered, as by typewriter 230, for instance, passes through OR gates 232 and 234 in serial format and is thus loaded into the first 18 most significant stages of register 164. The address portions of register 164, which includes frame number 166, first word 236, and last word 238 designations, are connected in parallel to frame number buffer 240, first word buffer 242, and last word buffer 244, respectively. The contents of frame number buffer 240 is in turn connected in parallel to comparator 140. This address is compared with the output of frame number detector 136 of signal processor 108, which address is stored in buffer register 138. A second output of buffer register 138 is connected to frame number display 139. The entire address 246 is strobed into buffers 240, 242, and 244 by an output of OR gate 248 of command and control logic 187. Word buffers 242 and 244 are connected as down counters and are pulsed by an output of word counter 250 through terminal T19, which receives an input from the output of OR gate 182 of channel select 116. Once the count in first word buffer 242 reaches zero, which indicates the start of the first selected word, flip-flop 252 is reset by an output of one-shot 254, disabling AND gate 256 and applying a set pulse through terminal T20 to flip-flop 212. This action also triggers flip-flop 258 and enables AND gate 260, whereafter buffer 244 is counted down to zero, indicating the last word has been selected. One-shot 262 is triggered, and an output pulse from one-shot 264 resets flip-flop 258, and through terminal T21, resets flip-flop 212. A strobe is applied through terminal T22 to BCD to decimal converter 154. A trigger pulse is applied to OR gates 248 and 184.

A correct answer, which is stored in portion 204 of register 164, is connected in parallel as one input of comparator 266. Buffer register 268 receives the answer supplied by a student response typically entered from typewriter 230. Assuming a correct answer is entered by a student, an output of comparator 266 initiates another cycle as determined by previously recorded information on video disc 10 and as selected by a command word now loaded in register 164. Character counters 269 and 270 control information flow to command register 164 and comparator 266, respectively. One-shot 272 strobes a command while OR gate 274 initiates a new cycle of events to player 16. The search for a new location is controlled by comparator 140 of address selector 142, and coincidence of address is indicated by output 275, which is coupled through terminal T23 to level detector 276, having an output fed through terminal T24 to slide motor drive 198.

OPERATION

In order to illustrate the operation as an instructional machine, it is assumed that a selected video disc 10 has just been placed in player 16 and a particular TV lecture from disc 10 is to be presented to a student. In order to select the desired material, reproducer 22 must be guided to the correct frame and word of that frame as follows.

Momentary switch 228 of command/control 18 is closed so as to change flip-flop 226 to a set condition. The set output SO of flip-flop 226 enables AND gates 218 and 220. Input device selector 216 is set to connect typewriter 230. Data and clock signals are thus connected as inputs to OR gates 232 and 234, respectively, and a clock signal is further connected as an input to character counter 269. The desired address and command word is now entered through stage 202 of register 164 in a serial format from typewriter 230. Assuming the lecture begins at frame number 25,000 and at the first word in that frame, then the address would be 25,000-0000-0001.

The next BCD digit 170 of register 164 determines the source of the first information, for instance, NTSC video, one of audio channels M-P, or 30 MHz. If the data is recorded in the video channel, then a (1) (0001) command is entered in stage 170 and connected to BCD to decimal converter 172. A "go-to" or (1000) "eight" is loaded into stage 192 which directs player 16 to search for and locate frame 25,000. The next three stages 199, 200, and 202 of register 164 will contain (0000) zeroes since no output device other than the TV set is to be selected. No data is loaded into the answer portion 204 of register 164 since no answer is applicable at this time.

Upon entering the last character in stage 202 of register 164, a clock pulse triggers character counter 269 (which has now counted the 18 characters entered into command register 164), and one output of counter 269 triggers OR gate 274, an output of which triggers OR gate 184. A second output of counter 269 resets flip-flop 226 and triggers one-shot 272. An output of one-shot 272 then pulses OR gate 248, which action strobes the complete frame number and word addresses into buffer registers 240, 242, and 244, respectively.

One output of OR gate 184 strobes the "go-to" or (1000) command just entered into state 192 of register 164 through OR gate 366 into command decode 194. This BCD number is decoded and produces a decimal output 279 which is fed through terminals T7 and T8 to slide motor drive 198 and as an inhibit signal to AND gate 156 and one input of still frame control 196. A second output of OR gate 184 resets flip-flops 174, 176, and 178 of command channel select 116 and strobes the (0001) one command through terminal T6, previously loaded into stage 170 of register 164, into BCD to decimal converter 172. This action enables AND gates 120 and 132 via the set output of flip-flop 174, and thus selects data from the video channel at the output of FM demodulator 118. With a "go-to" command applied at input 280, slide motor drive 198 of video disc player 16 is enabled in a search mode of operation and searches at maximum speed and in a direction as determined by input 282 of level detector 276 through terminal T24.

At the beginning of each frame (also coinciding with the start of each rotation of disc 10), a frame number is transferred from frame number detector 136 of signal processor 108 to buffer register 138 by terminal T4. This number is compared, by comparator 140, with the selected frame number which was previously strobed into register 240. As a result of this comparison, a voltage level is fed to input 282 of level detector 276, through terminal T23, which signifies whether the frame number from disc 10 is higher or lower than the desired location. In this way, slide motor 24 is directed to search in the proper direction. At the end of each vertical blanking pulse, a frame number is loaded into comparator 140 by an output of frame number detector 136 via terminal T5. When the desired frame is selected, an output 284 of comparator 140 triggers the set input S of flip-flop 252, changing it to a set state.

The set output SO enables AND gate 256, and a first pulse or count is thus fed to first word down counter 242 from word counter 250 through terminal T19. Since counter 242 contains all zeroes, a first pulse from word counter 250 produces an output 286 which sets flip-flop 212 through terminal T20, the set output SO of which enables AND gates 206 and 208 to permit data and clock pulses to be fed to the input of command register 164. Flip-flop 252 is also reset by an output of one-shot 254, and the reset output of flip-flop 252 sets flip-flop 258. At the end of one word time, register 164 is fully loaded, and the next count pulse from word counter 250 counts last word counter 244 down to zero, producing an output 288 which pulses one-shot 264. One output of one-shot 264 resets flip-flop 258, a second output of one-shot 264 resets flip-flop 212 through terminal T21, inhibiting AND gates 206 and 208, while a third output of one-shot 264 provides a strobe pulse to BCD to decimal converter 154 through terminal T22. No output device is selected, however, since a (0000) zero command was loaded into stage 202 from typewriter 230.

The set output SO of flip-flop 258 changes to a false condition, inhibiting AND gate 260, but more importantly, triggering one-shot 262, an output of which pulses OR gate 248 (through OR gate 374) to strobe a new address into registers 240, 242, and 244. A second output of one-shot 262 is applied through OR gate 374, to OR gate 184, which strobes, through OR gate 366, a forward scan (1001) decimal 9 command into command decode 194 and gates a command channel select digit to binary to decimal converter 174. It is assumed that the next command will be taken from audio channel 0, therefore a (0010) decimal 2 command has been loaded into stages 199 and 200 of register 164.

For the purpose of explanation of operation, it is further assumed that a four-minute TV lecture will be presented to a student. It is readily seen that when the "go-to" command was completed, input 279 of AND gate 156 is now true and TV sound from NTSC audio channel P and video from video FM demodulator 118 is now fed to TV set 158. A new frame address in buffer register 240 is presented as one input to comparator 140 of address select 142. Frame numbers are fed from frame number detector 136 to buffer register 138 via terminal T4. Therefore, as the lecture is being presented, a search is conducted by comparator 140 for the next command word within four minutes.

This lecture began at frame number 25,000, word one. Since 1,800 frames per minutes are being scanned by player 16, the next command word will be 1,800 times 4 (minutes), or 7,500 frames later, thus 25,000+7,500=frame number 32,500, and it is assumed that word four contains the next command. Therefore, the complete address is frame number 32,500, word four. This is (0011) decimal 3 in first word counter 242 and (0001) in last word counter 244. Once the selected frame number agrees with the present frame number, one output 284 of comparator 140 sets flip-flop 252 to initiate a word count as previously described, to select the desired word. Then, an output of first word counter 242 sets flip-flop 212 via terminal T20, enabling AND gates 206 and 208 to copy the selected fourth word into command register 164, this time from audio channel P, as previously determined. Upon the completion of the loading of a command into register 164, an output of last word counter 244 triggers one-shot 264, which resets flip-flops 212 and 258 and strobes an output device select digit into BCD to decimal converter 174. Further, the set output SO of flip-flop 212 of command select 116 strobes an output channel select digit into BCD to decimal converter 119 selecting audio channel 0. The set output of flip-flop 258 of address select 142 inhibits AND gate 260 and triggers one-shot 262. One output of one-shot 262, passing through OR gate 374, strobes another address through OR gate 248 into buffers 240, 242, and 244 while a second output of one-shot 262 pulses (through OR gate 374) OR gate 184 of command/control logic 187. One output of OR gate 184 strobes another command digit (through OR gate 366) into command decode 194, this time a forward scan-normal speed or decimal (6) command. Printer 152 is selected by BCD (through AND gate 148) to decimal converter 154, and a question for the student is printed out by printer 152 as information to printer 152 flows from audio channel 0. The same question is presented by TV set 158 from video channel 290 and audio channel P obtained through modulated oscillator 124 and AND gate 156. It is assumed that the question consists of 25 words which are copied by printer 152 during a 10-second interval.

The next frame number address then is 32,500+300 (for a 10-second presentation)=32,800 and at word number 1. Thus, when frame 32,800 appears in buffer register 138, an output 284 of comparator 140 again enables first word counter 242 which contains a zero (0000) command, and the first word is then copied into command register 164 as described above.

When last word counter 244 reaches a zero count, after one word, output 288 triggers one-shot 264. One-shot 264 resets flip-flops 258 and 212 as before. Flip-flop 212 inhibits data flow to register 164, while the set output of flip-flop 258 triggers one-shot 262, which strobes the next address into buffers 240, 242, and 244 and also triggers OR gate 184. The output of OR gate 184 strobes a "stop" command through OR gate 366 into command decode 194 and strobes a 3 (0011) channel select digit into BCD to decimal converter 174 of command channel select 116.

Still frame control 196 of player 16 is enabled by input 292 from command decode 194 via terminals T8 and T10, and TV set 158 shows one frame, 32,800 continually, which requests a student to enter an answer into register 268, as by typewriter 230, of input devices 214, or which may direct a student to select one of six particular regions, designated 1–6, of a display tube of monitor 158. Light pen 362 is placed against the face of monitor 158 within the selected segments 1–6 and supported in that position. Assuming segment 5 is selected, entry button 364 is then depressed, which directs disc player 16 to output the next six frames recorded on disc 10 as follows.

One output of entry button 364 (FIG. 2c) pulses OR gate 366, which strobes a forward scan command into command decode 194. A second output of entry button 364 pulses the set input of flip-flop 368, changing it to a set state. Set output SO of flip-flop 368 enables AND gates 370 and 371. An output of AND gate 372 is one input of OR gate 374.

Player 16 then displays the next frame numbers 32,801, 32,802, 32,803, 32,804, and 32,805. When 32,805 is displayed, light pen 362 is activated by the lighted segment 5 of monitor 168 and thus outputs a pulse to AND gate 371. An output of AND gate 371 triggers OR gate 374, which in turn pulses OR gate 248 to gate a new address into registers 240, 242, and 244 from the data that had been loaded into address selector 142 from the videotape or videodisc where that data was recorded coordinate with frame number 32,805. A second output of OR gate 374 gates a new command into command decode 194 through cascaded OR gates 184 and 366.

One output of OR gate 248 triggers one-shot 376, the output of which resets divide by 7 divider 372 on flip-flop 368.

As a safety feature, and in order to insure proper retrieval of information from disc 10, assuming no segment is selected by a student, then as the seventh consecutive frame is displayed, frame 32,807, divided by divider 372, outputs a pulse to OR gate 374, which selects an address and a command, as described above.

When typing an answer, a student would type an answer consisting of, for example, six alpha or numeric characters which are entered into response buffer 268 through AND gates 222 and 224. As the final character is entered, divide by 6 character counter 270 triggers OR gate 274, which in turn triggers OR gate 184, strobing a go-to command through OR gate 366 into command decode 194.

In a similar manner, as heretofore described, player 16 is directed to the next address, which is frame number 32,801, words 1–11. It is assumed that each word consists of an address and appropriate commands, and further that one word of the first 10 words includes a correct answer in answer portion 204 of register 164.

If, and after, the student has provided a correct answer in buffer 268, then as the data is copied into command register 164, an answer in portion 204 of register 164 matches with the answer in buffer 268. This initiates an output of comparator 266 to OR gate 248, which strobes a selected address associated with the appropriate commands in response to a correct answer. If no correct answer is given, then the eleventh word is copied into command register 164, and an output 288 of last word counter 244 triggers one-shot 264 to initiate another cycle of events directing the video disc or tape, for example, to a selected address of a multiplicity of possible addresses which are previously recorded on disc 10 appropriate to the lack of response.

Figure 3:
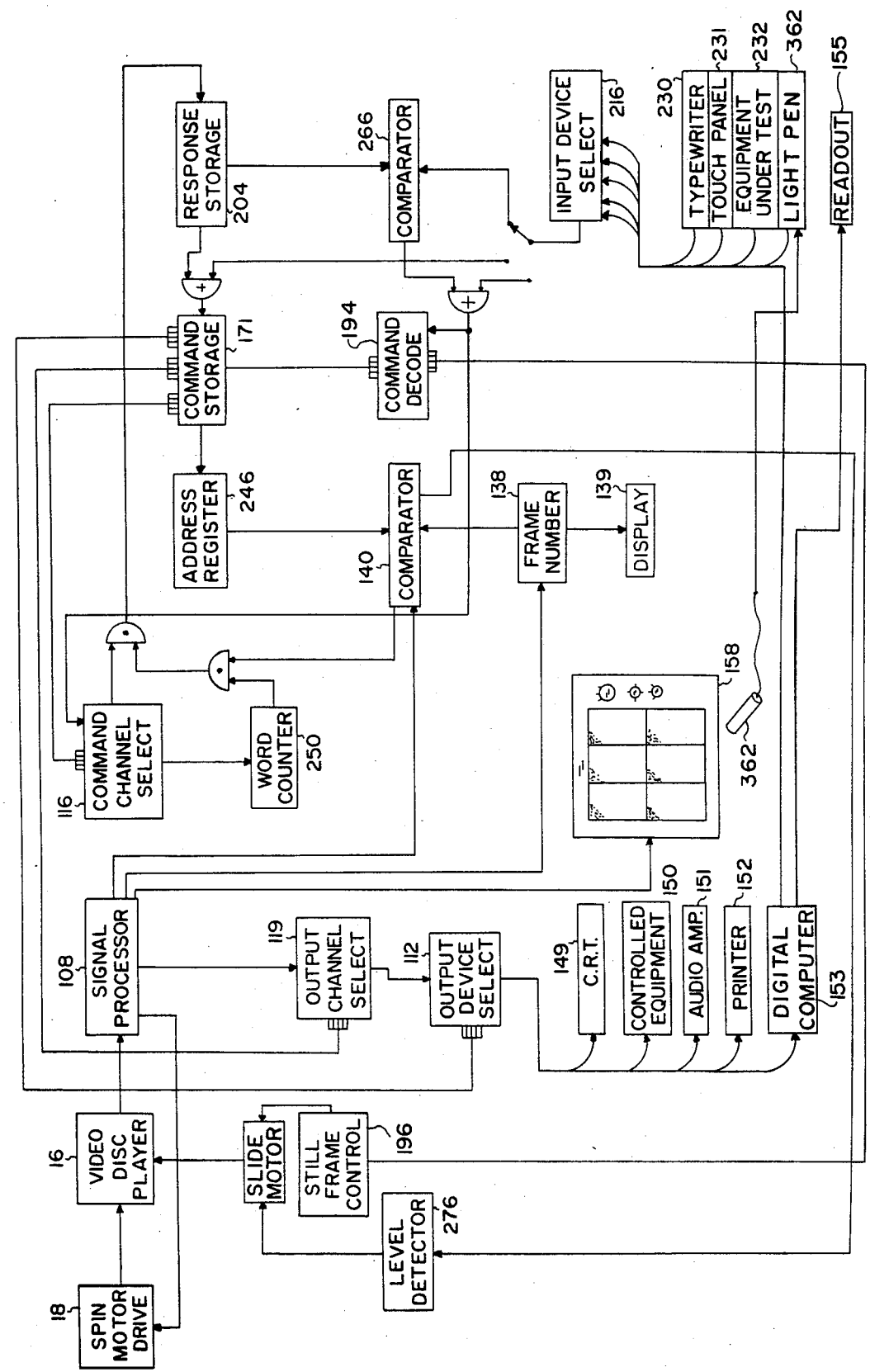
FIG. 3 is a block diagram broadly illustrating the system shown in FIGS. 2a–2c.

Additionally, computer 153 can be used as a means of extending or expanding upon general information supplied originally on disc 10. Thus, for example, disc 10 would provide digital information comprising a control program directed to and operative in computer 153. Computer 153 typically would have had certain data stored in it to be processed by the program from the disc, following which the program would output a signal through input device select 216 (FIG. 3) and to comparator 266. Comparator 266 would then make a comparison with data then available from video disc 10 and direct operation to a new address on disc 10, or to cause the disc to stop. Alternately, instead of terminating its function upon the provision of an output signal to device select 216, computer 153 may perform a parallel in time, independent, function to that of the video disc. Subsequently, when desired, signal exchanges may be effected to cause control to be reassumed by the disc over computer 153.

In addition to the system of processing light pen ordered frame detection signals heretofore discussed, other means may be employed. In one, using a digital data channel, wherever placed, a table of frame numbers and branch addresses would be loaded into the memory of a computer 153 before using images in a comparison operation. One would then single step through the image frame or frames until a response was obtained. Then, the frame number would be read out. Next, under software control of the computer, there would be obtained an address at which the same frame number was stored. The matching address would be extracted, and the playback device would be operated to the corresponding frame number and start reproduction. In computer programming terminology, this is referred to as an "indirect addressing" approach.

In accordance with a second alternate approach, the system would include means for single stepping frames until a frame number was found at which a response occurred, and the frame number would be stored in a computer 153. Then, from a table loaded in memory, and after all frames have been processed through, the system would look up a matching frame number and branch that corresponds to the matched frame number.

As still another alternate approach, the light pen would provide a gating pulse that would open a single register of a computer with proper timing to receive only the branch address digits which would be addressed. This register would also serve as a control register for the video disc or other storage medium, and branching would immediately occur to the indicated address.

As a still further alternate approach to the system described above would be to first detect via the light pen the frame number corresponding to the frame at which the light pen went "true" or to the "on" state. Following this, there would be transcribed from the recording, for example, six branching addresses fed into the six memory locations in a selected order. Then, by operation of the light pen as described, one of the six would be identified, and its identification number would be detected and compared with each of the numbers in the six memory locations to produce a branching address. Thus, the present system contemplates both a post response mode of operation with simultaneous image and address processing, the first embodiment described, and post response with sequential image and then address processing. Depending upon which approach is used, the recording process would be appropriately adjusted.

In accordance with this invention, a novel light pen system has been disclosed which is significantly simpler and cheaper to fabricate, prepare program materials for and use, than prior systems. Further, and of great importance, is the integration of this light pen system into a video disc playback system particularly capable of wide band usage and of the employment of the light pen system in a branching type interactive informational system capable of utilization both in a pre-response and post-response mode, a pre-response mode being more particularly described in the applicant's U.S. Pat. No. 3,996,671, and a post-response mode being more particularly described in the applicant's referenced co-pending application.

What is claimed is:

1. A light pen controlled interactive video system comprising:

a video recording including a track having recorded thereon first signals representative of frames of visual information, second signals located along said track, enabling the identification of the address of said frames, third signals coordinately located with certain of said first signals and including a plurality of signals, each of which plurality is representative of a frame of visual information having a different divisional area of a selected light state, and fourth signals, each fourth signal including at least one discrete digitally encoded character coordinately recorded with each said third signal;

video playback means, including a display, and responsive to a start signal for visibly reproducing on said display said first and third recorded signals and for providing as a signal output, said second and fourth signals;

photoresponsive means having a discrete photoresponsive field of view and means for supplying a timed output when viewing one of said divisional areas displayed on said display upon the appearance of a said selected light state, whereby the time of occurrence of the particular frame having that said selected light state in that discrete area is identifiable; and control means for providing a start signal to said video playback means wherein a portion of said recording is reproduced including the display of said frames of visual information having different lighted areas, said second signals, and a series of fourth signals, and said control means including means responsive to said second signals, said fourth signal, and said timed output from said photoresponsive means, for selecting a discrete fourth signal coincident with said timed output, and for effecting playback of said video playback means commencing at a frame of said recording identified by said discrete fourth signal.

2. A system as set forth in claim 1 wherein each fourth signal includes two digitally encoded signals, one of which commands playback at some point on said recording, and the other identifies the address on the recording for playback.

* * * * *